US009753864B2

United States Patent
Ekberg et al.

(10) Patent No.: US 9,753,864 B2
(45) Date of Patent: Sep. 5, 2017

(54) METHOD AND APPARATUS FOR IMPLEMENTING MEMORY SEGMENT ACCESS CONTROL IN A DISTRIBUTED MEMORY ENVIRONMENT

(75) Inventors: Jan-Erik Ekberg, Vantaa (FI); Jari-Jukka Harald Kaaja, Järvenpää (FI)

(73) Assignee: Nokia Technologies Oy, Espoo (FI)

( * ) Notice: Subject to any disclaimer, the term of this patent is extended or adjusted under 35 U.S.C. 154(b) by 167 days.

(21) Appl. No.: 14/125,415

(22) PCT Filed: Jun. 15, 2011

(86) PCT No.: PCT/IB2011/052606
§ 371 (c)(1),
(2), (4) Date: Dec. 11, 2013

(87) PCT Pub. No.: WO2012/172391
PCT Pub. Date: Dec. 20, 2012

(65) Prior Publication Data
US 2014/0115346 A1    Apr. 24, 2014

(51) Int. Cl.
*H04L 29/06*    (2006.01)
*G06F 12/14*    (2006.01)
(Continued)

(52) U.S. Cl.
CPC .......... *G06F 12/1408* (2013.01); *G06F 21/10* (2013.01); *G06F 21/6218* (2013.01); *H04L 9/18* (2013.01); *H04L 2209/805* (2013.01)

(58) Field of Classification Search
CPC .. G06F 21/10; G06F 12/1408; G06F 21/6218; H04L 9/18; H04L 2209/805
(Continued)

(56) References Cited

U.S. PATENT DOCUMENTS

| 7,725,558 | B2 | 5/2010 | Dickenson |
| 2003/0149869 | A1* | 8/2003 | Gleichauf ............... 713/153 |

(Continued)

FOREIGN PATENT DOCUMENTS

| EP | 1585329 | 10/2005 |
| WO | 2007/016298 A1 | 2/2007 |
| WO | 2010063088 | 6/2010 |

OTHER PUBLICATIONS

International Search Report received for corresponding Patent Cooperation Treaty Application No. PCT/IB2011/052606, dated Apr. 25, 2012, 5 pages.
(Continued)

*Primary Examiner* — Mahfuzur Rahman
*Assistant Examiner* — Narciso Victoria
(74) *Attorney, Agent, or Firm* — Mintz Levin Cohn Ferris Glovsky and Popeo, P.C.

(57) ABSTRACT

Various methods for implementing memory segment access control in a distributed memory environment are provided. One example method may comprise during a first write state for a memory segment receiving a cryptographic key stream in association with a request from a first device for use of shared storage capacity of a second device and causing the cryptographic key stream to be stored in the memory segment. Further, during the second write state for the memory segment, the example method may comprise receiving data content, transforming the date content using the cryptographic key stream to form encrypted data content, and causing the encrypted data content to be stored in the memory segment. Finally, during the first read state, the example method may comprise causing the encrypted data content to be provided to one or more requesting devices. Similar and related example methods, example apparatuses, and example computer program products are also provided.

24 Claims, 7 Drawing Sheets

(51) Int. Cl.
*G06F 21/10* (2013.01)
*G06F 21/62* (2013.01)
*H04L 9/18* (2006.01)

(58) Field of Classification Search
USPC .......................................................... 713/193
See application file for complete search history.

(56) References Cited

U.S. PATENT DOCUMENTS

| | | |
|---|---|---|
| 2005/0071632 A1 | 3/2005 | Pauker et al. |
| 2006/0020941 A1 | 1/2006 | Inamura et al. |
| 2006/0126850 A1 | 6/2006 | Dawson et al. |
| 2006/0242429 A1 | 10/2006 | Holtzman et al. |
| 2007/0140477 A1 | 6/2007 | Wise |
| 2009/0034733 A1 | 2/2009 | Raman et al. |
| 2009/0300719 A1 | 12/2009 | Ferris |
| 2011/0197056 A1* | 8/2011 | Chen ............................ 713/150 |
| 2011/0264906 A1 | 10/2011 | Pourzandi et al. |
| 2012/0137043 A1 | 5/2012 | Varteva et al. |
| 2016/0239696 A1* | 8/2016 | Mats ....................... H04L 67/04 |

OTHER PUBLICATIONS

"Optimized CRC Calculation", Reliable Software, Retrieved on Mar. 11, 2015, Webpage available at : http://www.relisoft.com/science/CrcOptim.html.
Shriraman et al., "Sentry: Light-Weight Auxiliary Memory Access Control", Proceedings of the 37th annual international symposium on Computer architecture, Jun. 19-23, 2010, pp. 407-418.
"ICODE as NFC Type ICODE Tag", AN11042, Revision 1.1, Mar. 21, 2011, 34 Pages.
Rousu, "Virtual File Repository for Mobile Phones", Thesis, 2008, 78 pages.
Extended European Search Report received for corresponding European Patent Application No. 11867958.8, dated Feb. 19, 2015, 7 pages.
Lee at al., "I2SEMS: Interconnects-Independent Security Enhanced Shared Memory Multiprocessor Systems", 16th International Conference on Parallel Architecture and Compilation Techniques, Sep. 15-19, 2007, 10 Pages.

* cited by examiner

METHOD AND APPARATUS FOR IMPLEMENTING MEMORY SEGMENT ACCESS CONTROL IN A DISTRIBUTED MEMORY ENVIRONMENT

RELATED APPLICATION

This application was originally filed as PCT Application No. PCT/IB2011/052606 filed Jun. 15, 2011.

TECHNICAL FIELD

Various embodiments relate generally to data integrity and security, and, more particularly, relate to a method and apparatus for implementing memory segment access control in a distributed memory environment that includes embedded or standalone radio frequency (RF) memory tags.

BACKGROUND

Mobile computing devices continue to become more powerful and dynamic with respect to high-speed communications techniques and powerful, yet compact, processing capabilities. Due to the demand for compact, handheld devices capable of performing complex computerized tasks and the increasing speeds of communications, the evolution of computing technology is moving towards leveraging distributed resources in the form of distributed data storage and computing capabilities, and being able to utilize local distributed content and connectivity effectively. Because access to these distributed resources is often shared with other devices (e.g., in a local domain), attention must be paid to the reliability and security of data that is being handled by these resources and by various user devices.

SUMMARY

Example methods, example apparatuses, and example computer program products are described herein that implement memory segment access control in a distributed memory environment. One example method may comprise, during a first write state for a memory segment, receiving a cryptographic keystream in association with a request from a first device for use of shared storage capacity of a second device and causing the cryptographic keystream to be stored in the memory segment. The example method may also comprise transitioning from the first write state to a second write state for the memory segment. During the second write state for the memory segment, the example method may comprise receiving data content, transforming the data content using the cryptographic keystream to form encrypted data content, and causing the encrypted data content to be stored in the memory segment. The example method may further comprise transitioning from the second write state to a first read state for the memory segment, and during the first read state, causing the encrypted data content to be provided to one or more requesting devices.

An additional example embodiment is an apparatus configured to implement memory segment access control in a distributed memory environment. The example apparatus may comprise at least one processor and at least one memory including computer program code, where the at least one memory and the computer program code are configured to, with the at least one processor, cause the apparatus to perform various functionalities. In this regard, the example apparatus may be directed to, during a first write state for a memory segment, receive a cryptographic keystream in association with a request from a first device for use of shared storage capacity of a second device and cause the cryptographic keystream to be stored in the memory segment. The example apparatus may also be directed to transition from the first write state to a second write state for the memory segment, and, during the second write state for the memory segment, receive data content, transform the data content using the cryptographic keystream to form encrypted data content, and cause the encrypted data content to be stored in the memory segment. Further, the example apparatus may be directed to transition from the second write state to a first read state for the memory segment, and during the first read state, cause the encrypted data content to be provided to one or more requesting devices.

Another example embodiment is a non-transitory computer readable medium having computer program code stored thereon, wherein the computer program code, when executed by an apparatus (e.g., one or more processors), directs an apparatus to perform various functionalities. In this regard, the program code may direct the apparatus to, during a first write state for a memory segment, receive a cryptographic keystream in association with a request from a first device for use of shared storage capacity of a second device and cause the cryptographic keystream to be stored in the memory segment. The program code may also direct the apparatus to transition from the first write state to a second write state for the memory segment, and, during the second write state for the memory segment, receive data content, transform the data content using the cryptographic keystream to form encrypted data content, and cause the encrypted data content to be stored in the memory segment. Further, the program code may direct the apparatus to transition from the second write state to a first read state for the memory segment, and during the first read state, cause the encrypted data content to be provided to one or more requesting devices.

Another example apparatus comprises means for receiving a cryptographic keystream in association with a request from a first device for use of shared storage capacity of a second device, during a first write state for a memory segment, means for causing the cryptographic keystream to be stored in the memory segment, during a first write state for a memory segment, means for transitioning from the first write state to a second write state for the memory segment, means for receiving data content, during the second write state for the memory segment, means for transforming the data content using the cryptographic keystream to form encrypted data content, during the second write state for the memory segment, means for causing the encrypted data content to be stored in the memory segment, during the second write state for the memory segment, means for transitioning from the second write state to a first read state for the memory segment, and means for causing the encrypted data content to be provided to one or more requesting devices during the first read state.

BRIEF DESCRIPTION OF THE DRAWINGS

Having thus described some example embodiments in general terms, reference will now be made to the accompanying drawings, which are not necessarily drawn to scale, and wherein:

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Further, the term "or" as used herein is not used in an exclusive manner (i.e., as an exclusive-or), but is defined as an operator that comprises at least one option in a collection, and possibly one or more other options within the collection.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

According to various example embodiments, methods and apparatuses are provided that facilitate the implementation of memory segment access control in a distributed memory environment that includes embedded or standalone RF memory tags. To do so, various example embodiments implement a memory segment life cycle where particular actions with respect to the memory segments are performed at different stages or states of the life cycle. The treatment of memory segments, as described herein, may be implemented in distributed data storage environments, where a given device may utilize the data storage (e.g., memory) in the form of an RF memory tag that is embedded into a mobile communications device (also known as an etag) or an standalone RF memory tag. The RF memory tags may expand the available storage capacity of a device that requires the memory to perform a particular task. In order to protect the integrity and security of data stored on another device, the memory segment life cycle and related concepts may be leveraged.

Figure 1:
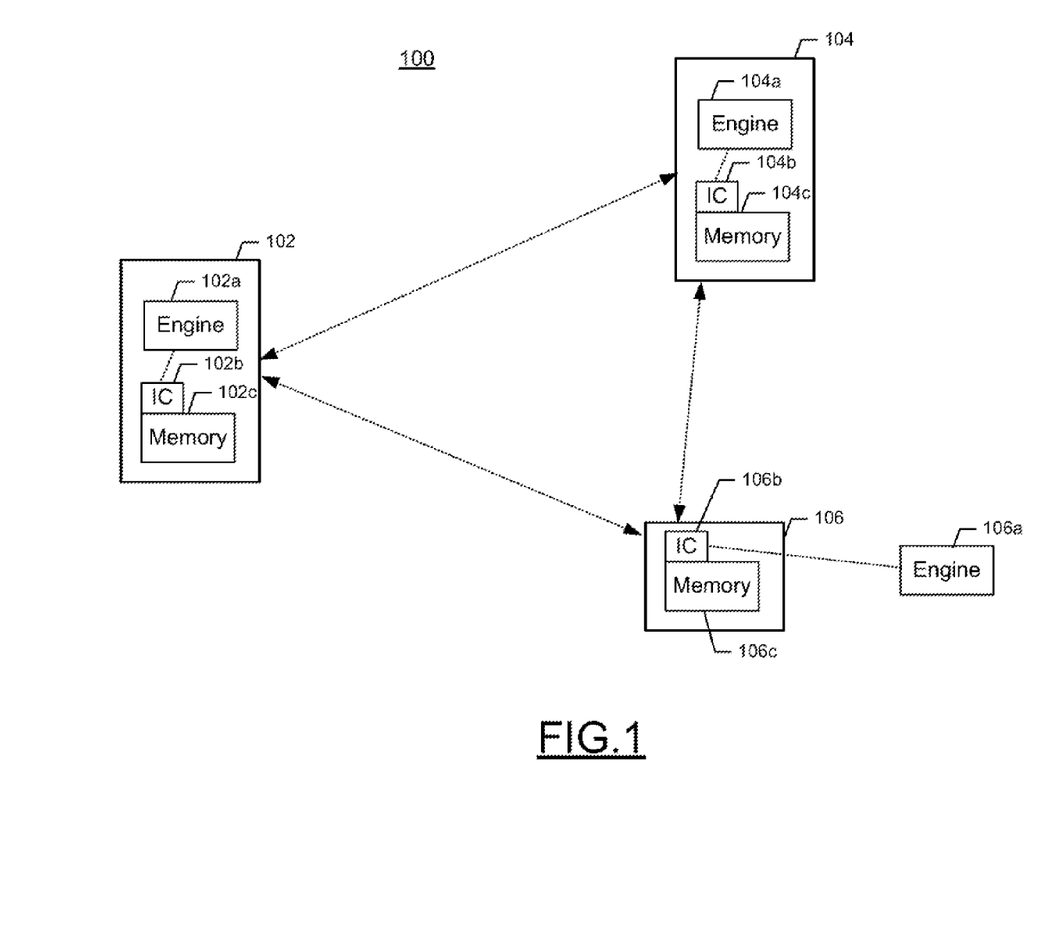
FIG. 1 illustrates an example an example distributed storage environment according to some example embodiments.

FIG. 1 illustrates an example distributed storage environment 100 that comprises a communications device 102 with an etag, another communications device 104 with an etag, and an RF memory tag 106. The communications devices 102 and 104 may be any type of a user equipment (UE) (e.g., cell phone, smart phone, reader, tablet or pad device, or the like), or a component of a UE, that is configured to comprise computing and communications (e.g., close proximity wireless, including near field communications (NFC) and any other future higher speed close proximity connection) capabilities. The communications devices may comprise respective etags which may include memories 102c and 104c. The data storage capacity of the memories may be shared with the network as a wireless memory resource, for example, with close proximity coverage. The memories 102c and 104c may be any type of memory device, but are often implemented as non-volatile memories, and may be configured to operate in an active or passive mode. The memories 102c and 104c may be controlled by associated, respective integrated circuits (ICs) 102b and 104b. The ICs 102b and 104b may be any type of processors or other hardware devices that are specifically configured to perform memory management and access control as described herein. Each device may also implement an on-board or remote engine that manages and implements functionality that may be required for memory resources including, for example, logic updates, memory configuration, data logging management, and the like. The engines may be implemented in hardware and/or a combination of hardware and software. The engines 102a and 104a may, in some example embodiments, be implemented by the ICs 102b and 104b, respectively and may configure and maintain the configuration of the memories. In example embodiments where the devices 102 and 104 are mobile handsets, the engines may also be configured to implements the various functionalities of the handsets.

The environment 100 may also comprise one or more standalone RF memory tags that are not embedded or integrated into a communications device, such as RF memory tag 106. The RF memory tag 106 may be configured to perform little or no functionality other than to provide additional memory resources to the environment 100. Similar to the communications devices, the RF memory tag 106 may comprise an IC 106b and a memory 106c. The memory 106c may be configured to operate in an active or passive mode. Since the device 106 is an standalone RF memory tag, the engine 106a, for configuring the memory, may be implemented remotely, and may be configured to interface with the device 106 at various times to perform logic updates, tag and memory configuration, data logging management, and the like. In this regard, according to some example embodiments, the IC 106b of the RF memory tag 106 may be the only on-board computing component. The RF memory tag 106 may be an active tag that comprises an internal power source for executing functionality, or a passive tag that relies upon the receipt of a powering signal to power the tag and perform functionality. According to various example embodiments, the RF memory tag 106 may support wireless communications, including NFC, where, for example, there is one radio frequency for wireless power transfer (e.g., in NFC, ultra-high frequency (UHF), or the like) and the other for wireless data transfer (e.g., Impulse ultra-wideband (UWB)).

Through the operation of the embedded and standalone RF memory tags, the environment 100 may permit the implementation of shared memory resources. In this regard, for example, the communication device 102 may store data in memory 104c of the communications device 104 and/or in the memory 106c of the tag 106. To implement this type of resource sharing, a particular type of network, which may be referred to as a smart space, may be implemented.

As described above, RF memory tags and systems that utilize RF memory tags may support the storage aspects of smart spaces and similar environments. These environments may provide high data rate communications at 10-100 Mbit/s between devices (e.g., a reader/writer device and a remote memory device such as an RF memory tag). The memories of the tags may comprise large capacities (e.g., one or more Gigabits) operating over a very high data rate communication channel (e.g., impulse radio ultra wide band (UWB) at 7.9 GHz). A system or environment may be based on NFC and/or UHF, and the system or environment may enable smart spaces where a number of devices may use a shared view of resources and services. The smart spaces may provide a better user experience by allowing the user to introduce new devices to the network flexibly and to access some or all the information in the multi device system from any of the devices. As such, these technologies may combine high wireless access speeds to memory components with a high storage density, e.g., RF memory tags that may be embedded or standalone. These devices may be able to receive or send large amounts of data almost instantaneously by two devices "touching" or being in close proximity to each other for high bandwidth communications.

RF memory tags may not support a type of access control for reading and writing from/to the memory device. As such, situations may arise where multiple users are accessing the same memory device causing issues such as data interference and the like. Additionally, the shared memory resources of the tags may require a level of encryption that can be readily implemented and/or supported by simpler devices, such as an RF memory tag.

According to various example embodiments, within the context of a shared resource environment, memory access control of memory segments of embedded and standalone RF memory tags may be implemented in a manner that constructs a hardware-assisted asymmetric cryptographic system for RF memory tags. Conceptually, according to various example embodiments, the environment upon which some example embodiments are described may be a system where a memory device within an RF memory tag (embedded or standalone) is set up to contain an available memory segment, and every write into such an segment may be transformed into an encrypted and integrity protected blob that can only be recovered by an intended recipient. As such, a memory segment as described herein may refer to storage portion of a memory device on an embedded or standalone RF memory tag.

To create secure access control of the memory usage, the device that requires the storage of data content may prepare the required memory segments by initializing or configuring a target memory and associated memory segments of the target memory using access rights and restrictions. This may occur during a first state of the life cycle of a memory segment relative to the data content to be stored. The device may first initialize and prepare the needed segments that will ultimately store the transferred data content. During a second state of the life cycle received data may be encrypted and stored in the memory segments. In addition to implementing the encryption, data integrity checks may also be performed during the second state. Finally, during a third state of the life cycle, the stored, encrypted data may be read and forwarded to requesting devices, possibly without interpreting the data prior to forwarding. The memory segment may remain in this third state until a memory reset occurs or, for example, until a validity time expires. According to some example embodiments, a fourth state may be additionally provided where a higher level of security may be implemented by utilizing a subscription key to open the content or any other privacy rules available or set to the tag (e.g., for device reading or writing to the tag). Further, according to various example embodiments, different memory segments within a memory may be at different stages of the life cycle and therefore the memory segments may have different access controls as a given time. Additionally, with a change in the configuration of one more memory segments, a change in the accessibility control may be implemented.

Because the device that initially requested the additional storage is aware of the encryption used to store the data in the memory segment, this device is able to subsequently decrypt the data, when needed, for utilization, even though the device where the data is stored may not be aware of the encryption. As such, the storing device need not be configured to support particular encryption techniques, thereby simplifying the processing needed to support the storage of information within the distributed memory environment.

Figure 2A:
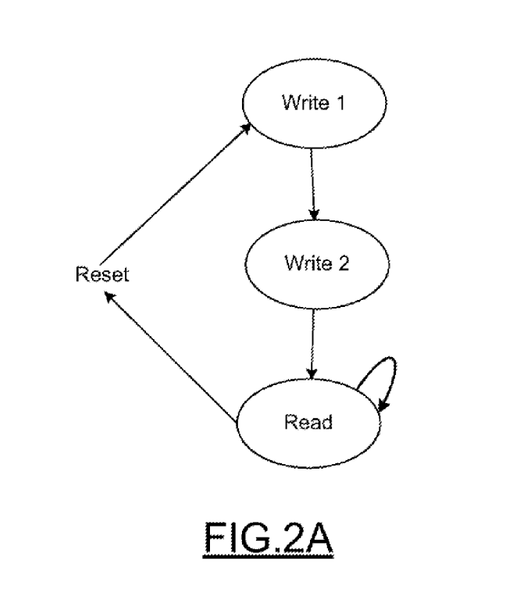
FIG. 2A illustrates an example state diagram for the life cycle of memory segment in accordance with some example embodiments.
Figure 2B:
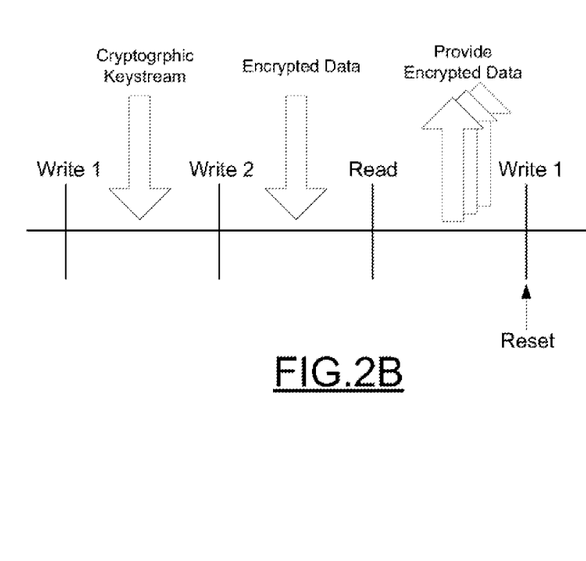
FIG. 2B illustrates an example timing diagram for the life cycle of a memory segment in accordance with some example embodiments.

FIG. 2A is a state diagram that describes the states, and the sequence of states (or life cycle) that may be used for the storage and retrieval of data within an RF memory tag. The state diagram describes an example access control scheme that can be implemented by the devices involved in the storage of data. The sequence of states may be correlated to time slots, during which particular functionalities may be performed, and other functionalities prevented. As depicted, the sequence of states may comprise two write states (Write 1 and Write 2) and a read state (Read). A reset event may return the life cycle to the Write 1 state. FIG. 2B illustrates a timing diagram for a single iteration of a life cycle of a memory segment.

According to various example embodiments, the states of the memory segment life cycle, also referred to as the access control modes, may dictate the access permissions that are available to devices at given times, in terms of combining read, write, delete, and possibly edit rights. According to various example embodiments, the permissions or rights may be applied on a per segment basis, rather than on an access entity basis. By allocating the permissions in this manner, a cryptograph generation block is not required to be implemented on the tag's IC for the purpose of providing source entity authentication and associated access control. According to some example embodiments, since the storing device need not comprise cryptograph generation and interpreting capabilities, any device (including devices with no prior knowledge of any cryptographic keystreams) may write data content to shared memory such that the data thereafter is encrypted and integrity-protected for consumption by peer devices with the proper key material to decrypt the data content. Further, according to various example embodiments, a technique is described that facilitates the construction of a system by which source or storage requesting entities, having the proper key material and information, may be authenticated prior to, for example, writing data content to a segment, possibly with the constraint that the number of times the authentication can be carried out may be limited. The memory segment may therefore be (e.g., during a segment configuration operation) initialized, and thereafter, according to some example embodiments, nothing may be read from the segment until the segment is written to. After the segment is written to, any device or entity may read the encrypted and integrity protected content that is stored in the memory segment.

Referring again to FIGS. 2A and 2B, when memory segments are in the Write 1 state, the memory segments may be configured. According to some example embodiments, when a memory segment is in the Write 1 state, the memory segment may only be written to (may not be read from). During the Write 1 state, the storage requesting device may request the allocation of memory segments on a remote memory device for the storage of data content. The memory segments may be configured such that they are any size, noting that overhead for maintaining the segments (e.g., the memory utilized for the configuration area) may be increased as the size of the segments are decreased. In some example embodiments, the size of a memory segment may be an approximation of an average message size. As part of the process for allocating the memory segments, the storage requesting device may take action with respect to source authentication and make preparations for the encryption of data content.

With respect to performing functionality relating to source authentication, one or more options may be considered. For example, if the storage requesting device is, or is expected to be, equipped with an engine as described above (e.g., an etag such as those comprised in communications device 102 or 104), then a set of tuples may be stored in the configuration area or in a non-readable portion of memory that may, in some example embodiments, correspond to a challenge-response system using, for example, a keyed message authentication code (MAC). Alternatively, if two devices that do not comprise internal engines (e.g., stand-alone RF memory tags) need to authenticate each other, then an integrity-protection encryption feature of the data protection system, described in further detail below, may be used to perform authentication. In some example embodiments, techniques involving the use of keyed cyclic redundancy check (CRC) algorithms may be implemented.

Source authentication, at least in with respect to tag-to-tag or transfers of data between non-internal engine devices, can follow from the encryption functionally that may be performed. With respect to performing functionality relating to the encryption of data content, the storage requesting device may perform functionality associated with the preparation of one or more cryptographic keystreams (keys or functions). The cryptographic keystreams may be transmitted to the memory device for storage in their respective memory segments. Because the device requesting the memory is aware of the now stored keystream, use of the keystream by the storing device implements a type of source entity authentication, when the encrypted data is later read from the memory segment. It is noteworthy that, according to some example embodiments, the storing device (e.g., an RF memory tag) does not require the functionality to generate the keystreams. Rather, the keystreams may be generated at the storage requesting device and sent to the storing device. As such, the storing device is not required to have cryptographic functionality or supporting hardware.

More particularly, the encryption harness that may be utilized may operate to set up intermediate computation results for generating an authenticated encryption blob in the memory segments. According to some example embodiments, to perform encryption, the IC of the storing device may be configured to perform algorithmic computations involving the keystream stored during the Write 1 state and the data content received and stored during the Write 2 state. In some example embodiments, these computations may be trivial in nature to avoid the need for increasingly complex hardware for the ICs.

The engine of the storage requesting device, having a key, may calculate the cryptographic keystream as mentioned above. The keystream may be in the form of, for example, an Advanced Encryption Standard (AES)-128 key in a counter mode (CTR). The keystream may be transmitted to the storing device and stored in the memory segment while the memory segment is in the Write 1 state. Additionally, based on the keystream (e.g., an AES keystream), a diversified 128-bit unit scrambling key and associated polynomial may be generated. Further, if the IC of the storing device has CRC functionality that can be configured, the scrambling key may be stored in dedicated places within the memory segment or series of segments for use when the stored data is later forwarded. If the IC does not comprise CRC functionality, a CRC byte precomputation (e.g., a table of 256 bytes) may be calculated using the scrambling key, and the result may be stored in the memory segments to simplify computation when the data content is written to the memory segment during the Write 2 state, as further described below. As such according to some example embodiments, during the Write 1 state, the generated integrity check table may be stored in the memory device.

Figure 3A:
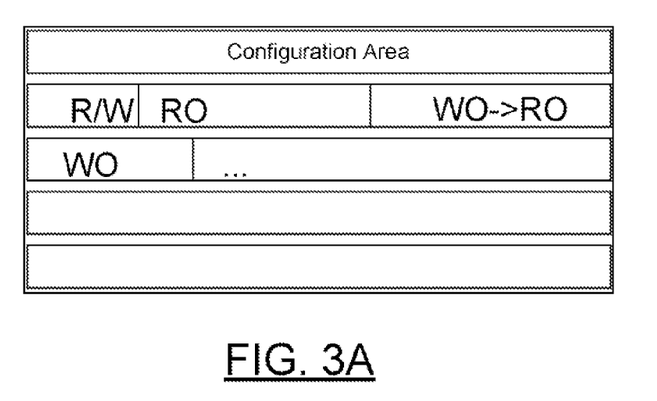
FIG. 3A illustrates a memory block with a configuration area according to an example embodiment.

In addition to handling the cryptographic keystreams, other memory segment configuration operations may be performed during the Write 1 state. In this regard, the IC performing memory access control on the storing device may access and modify a configuration area of the memory that is assigned to a memory segment as illustrated in FIG. 3A. The configuration area may store parameters that are used during interactions with the memory segments. As such, various information is stored in the configuration area including, segment information, segment state information, authentication information, and/or a log of past transactions. With regard to segment information, the memory may be segmented into parts or segments with distinct access control configurations, and the respective ranges of the segments and the segment's access control configuration may be stored in the configuration area. With regard the segment state information, an indication of the state (e.g., Write 1, Write 2, Read, etc.) may be buffered or logged in the configuration area and the indication may be modified as the operations of the lifecycle of the associated memory segment are performed and completed. The segment state information can therefore be utilized to determine the state of a memory segment as the access control configurations change over time (e.g., from Write 1 to Write 2 to Read), and the state may stored in the configuration area. Further, authentication information may be stored in the configuration area, and the authentication information may permit a particular entity or device to manage the configuration area through a respective IC. According to some example embodiments, the authentication information regarding this edit right may be stored in the configuration area. Finally, the configuration area may also house a log of the past transactions.

Upon transitioning to the Write 2 state, data content may be written into the allocated memory segments in an encrypted form. The trigger for moving from the Write 1 state to the Write 2 state may be implemented, for example, by the storage requesting device via a Write 1 state complete signal or the trigger may occur when the last byte of the allocated memory segments has been written to. During the Write 2 state data may be only be written to the memory segments and reading from the memory segments may not be permitted. However, according to some example embodiments, any device may be permitted to write to the memory segments in the Write 2 state.

Upon receipt from a storage requesting device, the received or input data content may be acted upon using the keystream that was stored in the memory during the Write 1 state. As the received data is written to the memory segments, an exclusive-or (XOR) operation may be performed using the keystream and the received data content.

Figure 3B:
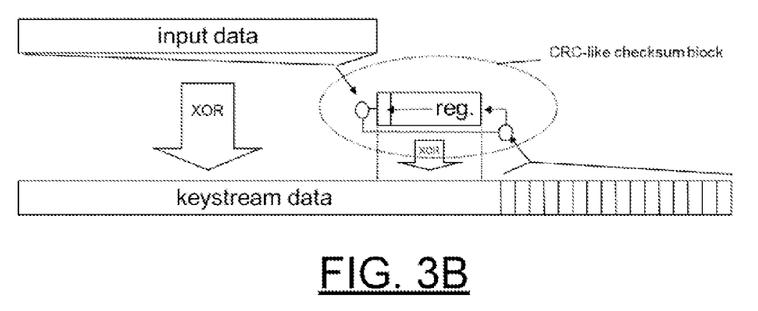
FIG. 3B illustrates an example operation for generating encrypted data with a cyclic redundancy check according to an example embodiment.

According to some example embodiments, in parallel with the XOR operation for the input data, the IC of the storing device may calculate a CRC with the stored polynomial. Alternatively to using the polynomial, the IC of the storing device may maintain a register (e.g., a 128-bit register), and for each received byte, the IC may XOR the top byte of the register with the received byte into a temporary 8-bit value. The IC may then shift the register 8 bytes towards the top, and add the value from the table indexed to the bottom end of the register. As such, the IC may be configured to perform an XOR operation and maintain a single register. In either instance, when the transformation of the received data content is complete, the register contents are XORed with the stored keystream, similar to the handling of the data content, and the result may be appended to the encrypted data. FIG. 3B illustrates this operation of generating the encrypted data for storage in the memory segment. Upon completion, memory segments may move to the Read state. However, in some example embodiments, a reset may be implemented after the Write 2 state, if no read operation occurs within a threshold duration of time.

The encrypted data that resides in the memory segments may therefore be decipherable only by entities (e.g., engines) that have the keys by which the encryption harness was originally produced. As such, according to various example embodiments, the resulting encryption can be strong and its integrity may be assured. Further, the same or a similar encryption harnessing may be used iteratively as content is moved directly between memory segments on different devices, such as between tags. Accordingly, a trace of the manner in which the content has been moved between devices may be realized based on the iterative use of the harness. Further, during mere transfers of the data between devices within a smart space or other similar environment (e.g., to maintain accessibility to the data), cryptographic processing need not be preformed by the sending IC.

When the memory segments are in the Read state, the encrypted data stored in the memory segment may be read and forwarded to a requesting device. The transition from the Write 2 state to the Read state may be triggered by the storage requesting device via a Write 2 state complete signal or the trigger may occur when the last byte of the allocated memory segments has been written to for storage of the encrypted data. In the Read state, according to various example embodiments, a memory segment may only be read from and may not be written to. However, in some example embodiments, the memory segments may be written to, but doing so may result in destroying the integrity of the data. In the Read state the memory segments may be read any number of times by any device, although in some example embodiments, access control may be performed to limit the devices that are permitted to read the data content from the segment. Similarly, in some example embodiments, a read limitation may be implemented such that a limit is placed on the number of reads and the limit amount may be determined based on factors including the content owner, the service provider, a timer value, and the like. According to various example embodiments, since only those devices that have the encryption keystream would be able to interpret the data in the segments, the use of this manner of encryption also performs an authentication function. Accordingly, based on various example embodiments, an encryption harness for constructing an authenticated encryption with associated data may be implemented to support memory access control. The encryption harness may also facilitate the construction and utilization of an authenticated encryption with associated data (AEAD) message.

According to some example embodiments, after the Read state, a Subscription Read state may be implemented. During the Subscription Read state, subscription-based content stored in a memory segment (e.g., data content requiring a subscription key and having preordered content with an open ID) may be accessed. The protection provided by the subscription may have been applied to the data during the Write 1 state possibly with other encryption. As such, during the Subscription Read state, the storing device may forward additional subscribed data content to the requesting devices, which presumably have the subscription key.

According to FIGS. 2A and 2B, upon the execution of a reset event, the memory segment may revert back to the Write 1 state. In some example embodiments, a reset event may only change the state of a memory segment to the Write 1 state when the memory segment is currently in the Read state. However, in other example embodiments, a reset event may change the state of a memory segment to the Write 1 state regardless of the current state of the memory segment. In some example embodiments, a reset event may occur when a storing device receives a particularly formatted message or signal that requests that the memory segment be reset to the Write 1 state. Alternatively, or additionally, a reset event may occur when the memory segment has been read a threshold number of times. Alternatively, or additionally, a reset event may occur when a read has not taken place for a threshold period of time and the content of the memory may be stale.

Having described one example life cycle that may be implemented in accordance with various example embodiments, it is contemplated that other example life cycles may also be implemented. For example, rather than the Write 1-Write 2-Read life cycle described above, a Write 1-Read 1-Write 2-Read 2 life cycle may be implemented. In this regard, the Write 1, Write 2, and Read 2 states may facilitate operation of the same or similar functionality as the Write 1, Write 2, and Read states, respectively, as described above. However, Read 1 may involve the reading of particular data in the memory as a stage in the life cycle. Further, according to various example embodiments, one or more read states and associated operations may be implemented, for example, in advance of the Write 1 operation to permit write access to a memory segment.

Figure 4:
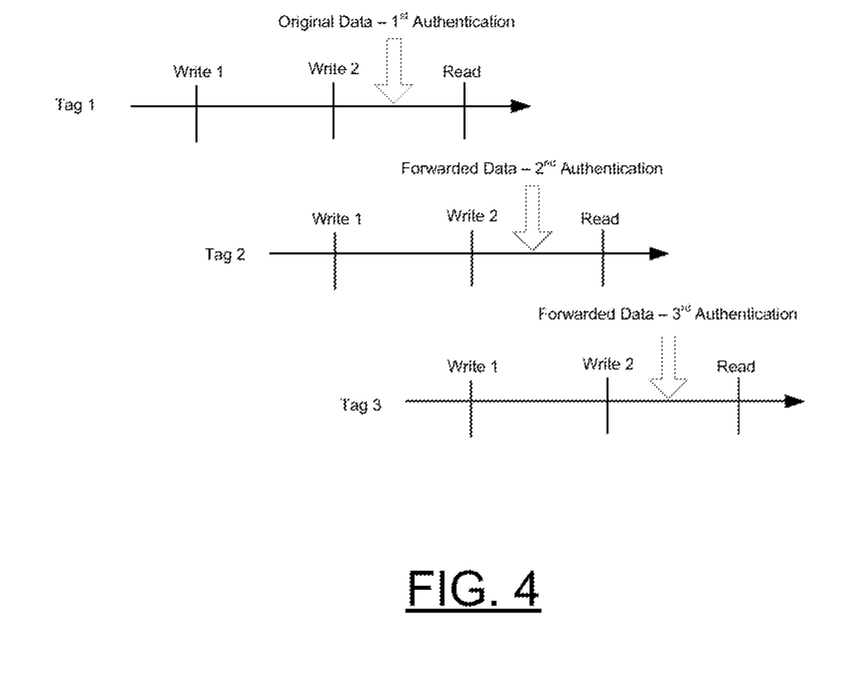
FIG. 4 illustrates a transfer of a data between memory segments to permit path authentication according to an example embodiment.

Having described the lifecycle of the memory segment both from the perspective of the storage requesting device and the storing device, the concept of path authentication will now be described. Because the data content stored within the smart space or similar system may need to be replicated or transferred to a different device for a variety of reasons, path authentication may also be implemented within the environment. In the case where data is transported from memory to memory (or RF memory tag to RF memory tag), and the memories are deploying the same security system, the data may be encrypted, and authenticated using an onion model, where each device on the path adds a layer of authentication to the original data. This technique is illustrated in FIG. 4 where the original data is first stored in the memory of Tag 1 (during its respective Write 2 state) with a first layer of authentication, then stored in the memory of Tag 2 with a second layer of authentication, and then stored in the memory of Tag 3 with a third layer of authentication. Via the various layers of authentication, the routing of data between memories can be determined, e.g., in delay-tolerant networks. Such authentication may also be used for building incentivized transfers, where parties participating in the routing of packets may be rewarded, by the system, for their participation.

Additionally, various example embodiments of the present invention support secure access of memory segments on two channels. In this regard, memory segments may be allocated based on the channels used to access the memory segments. As such, according to various example embodiments, there may be no overlap between the memories allocated to the memory segments designated to the channels. Further, according to some example embodiments, the channels for accessing the memory segments may comprise an internal device channel and an external device channel. The internal device channel may be used to access memory that is housed within the same device, while the external device channel may be used to access memory that is remote or external to a device and housed in a separate device. In this regard, for example, a device may utilize three memory segments on a local etag via an internal channel and utilize two memory segments on an external tag. Regardless of whether an internal channel or an external channel is used, the access control lifecycle and associated techniques can be implemented.

Additionally, the memory of a device may be divided into memory for use internally, memory for use by the operating system, and public data that is accessible remotely. In some example embodiments, a device may be able to utilize a certain amount of memory segments (N) from a local etag and a certain amount from the RF part (via its internal channel). Another mobile device may be able to utilize a certain amount of memory segments (M) at least from the RF part and additionally from the etag part (via its external channel). Additionally, a fourth memory area may be designated that is writable by everyone but readable only by one device. The fourth type of memory may provide a portion of private memory for a device that does not have an engine, but rather comprises, for example, only an IC and a memory, where the IC does not necessarily support cryptographic functionality.

This fourth type of memory may be written to multiple times, but may be only be read by a particular device, and in some example embodiments, may only be read once, before being reset. This type of memory may be useful for a variety of applications such as when a device is malfunctioning. This memory space may provide a mechanism for a maintenance and recovery service, where user data can be retrieved from such a device to another device. Further, this memory space may be used to take snapshot of user data, such as when the device is entering a power save mode, for forwarding and use on another device.

The memory lifecycle and related techniques described above can be implemented in a number of settings. For example, various example embodiments may be implemented through the usage of NFC tags as "public bulletin boards," where message "targets" can be allowed to set up segments for messaging that are destined for use by the segments. Various example embodiments may be implemented such that the memories are involved in the collection of privacy sensitive sensor readings from sensors deployed, for example, in the field to back-end processing systems.

In a more complex use case, the various example memory life cycle and access control techniques described herein may be leveraged for use in the purchasing of a train ticket. The ticket application on a mobile device may prepare memory segments in the device's etag memory (e.g., segments 1-10) at the Write 1 state, with correct cryptographic keystreams either in advance of purchasing the tickets or at the time of purchase. The ticket machine may write the ticket with plain text to the allocated memory segments during the Write 2 state using, for example, an XOR crypt stored at one or more of the allocated memory segments. The mobile device's ticket application may be able to read and decrypt the stored data to perform a data validity check. A ticket receiving machine (where the ticket is consumed) may read the etag ticketing memory segments in the encrypted format and forward the used ticket to the cloud (e.g., anonymously) to determine whether the tickets match values in the ticket pool, or a validity of the tickets may be checked with a traffic provider management key.

Accordingly, various example embodiments provide an affordable (in terms of extra logic) cryptographic solution for RF memory tags that are not public, but rather have a clear ownership. Some of the example embodiments described herein implement a mechanism that would provide the owner of the RF memory tag with a system where the detachable tag/memory may serve as a trusted channel for any data to leverage within the security domain of that owner, even though the owner of the detached memories may have no physically separate and secure means of communication with the tag that is different from the mechanisms the data writers would use to access the tag, and the tag itself need not hold expensive cryptographic logic. However, in accordance with various example embodiments, data written to segments protected as described herein may not be "eavesdropped" or modified by a third party until the data is read by the owner.

Figure 5:
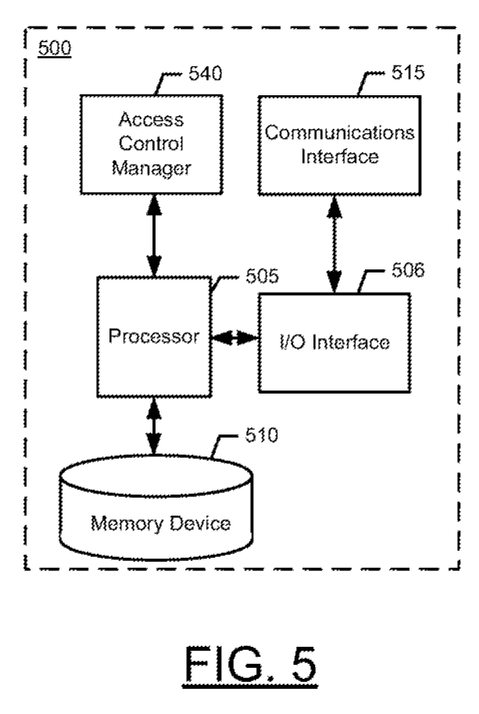
FIG. 5 illustrates a block diagram of an apparatus that is configured to implement memory segment access control in a distributed memory environment according to an example embodiment.
Figure 6:
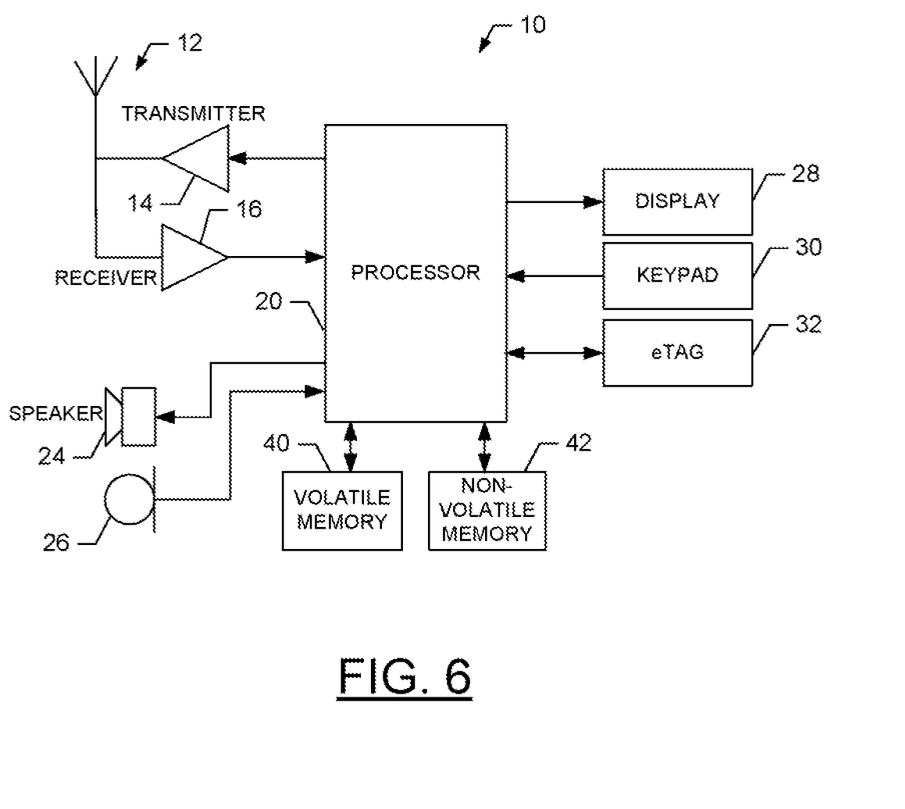
FIG. 6 illustrates a block diagram of a mobile device configured to implement memory segment access control in a distributed memory environment according to an example embodiment.
Figure 7:
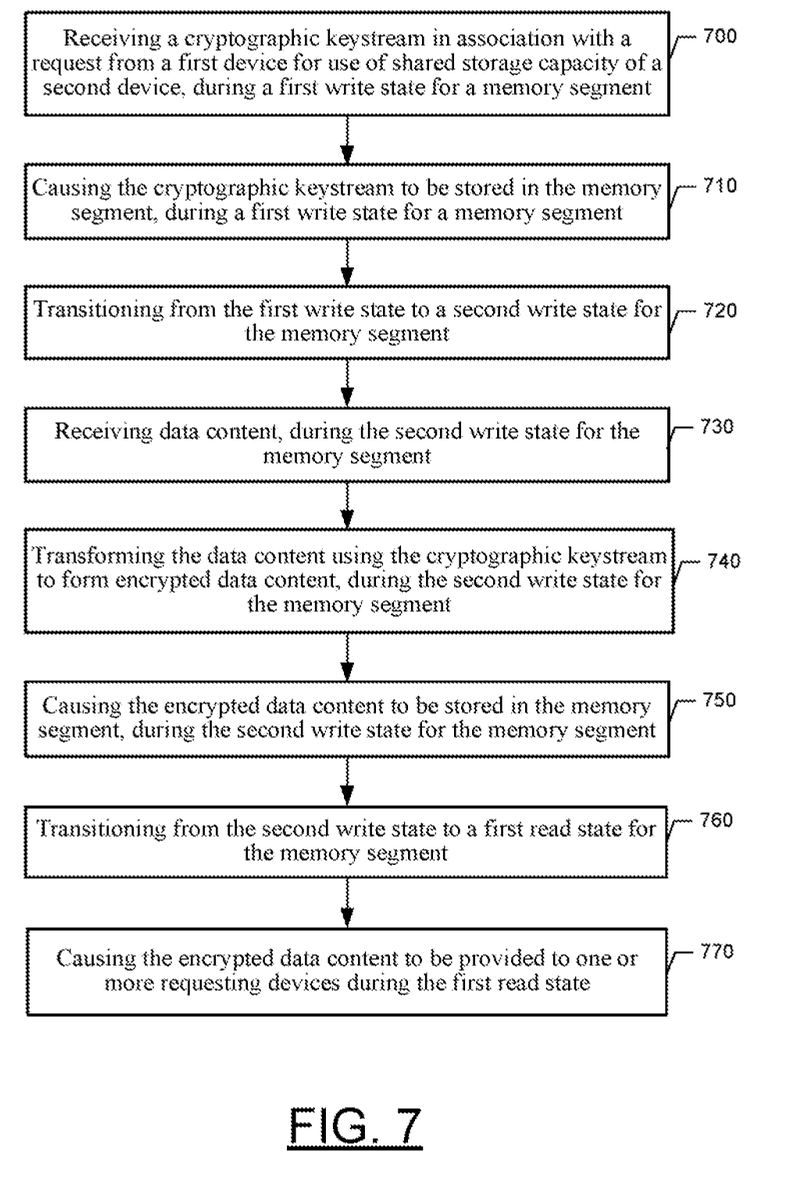
FIG. 7 illustrates a flow chart of an example method for implementing memory segment access control in a distributed memory environment according to some example embodiments.

Having described some example embodiments above, FIGS. 5 and 6 depict example apparatuses that may be configured to perform various functionalities as described herein, including those described with respect to FIGS. 1A through 4 and the associated text. Additionally, FIG. 7 illustrates an example method or algorithm that may be performed by the apparatuses of FIGS. 5 and 6 that incorporates the various features and functionalities described herein.

Referring now to FIG. 5, an example embodiment is depicted as apparatus 500, which may be embodied as an electronic device, such as a standalone or embedded RF memory tag. In some example embodiments, the apparatus 500 may be part of a mobile electronic device such as the communications devices 102 and 104, or the tag 106. As a mobile device, the apparatus 500 may be part of a mobile and/or wireless communications node such as, for example, a mobile and/or wireless server, computer, access point, handheld wireless device (e.g., telephone, tablet/pad device, portable digital assistant (PDA), mobile television, gaming device, camera, video recorder, audio/video player, radio, digital book reader, and/or a global positioning system (GPS) device), a wireless memory tag, any combination of the aforementioned, or the like. Regardless of the type of electronic device, apparatus 500 may also comprise computing capabilities.

FIG. 5 illustrates a block diagram of example apparatus 500, which may comprise or be otherwise in communication with various components including, but not limited to a processor 505, a memory device 510, an Input/Output (I/O) interface 506, a communications interface 515, and an access control manager 540. The processor 505, which may be embodied as IC 102b, 104b, or 106b, may, according to some example embodiments, be embodied as various means for implementing the various functionalities of example embodiments including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 505 may be representative of a plurality of processors, or one or more multiple core processors, operating in concert. Further, the processor 505 may be comprised of a plurality of transistors, logic gates, a clock (e.g., oscillator), other circuitry, and the like to facilitate performance of the functionality described herein. The processor 505 may, but need not, comprise one or more accompanying digital signal processors. In some example embodiments, the processor 505 may be configured to execute instructions stored in the memory device 510 or instructions otherwise accessible to the processor 505. The processor 505 may be configured to operate such that the processor causes or directs the apparatus 500 to perform various functionalities described herein.

Whether configured as hardware or via instructions stored on a computer-readable storage medium, or by a combination thereof, the processor 505 may be an entity and means capable of performing operations according to example embodiments while configured accordingly. Thus, in example embodiments where the processor 505 is embodied as, or is part of, an ASIC, FPGA, or the like, the processor 505 may be specifically configured hardware for conducting the operations described herein and the algorithms described herein. Alternatively, in example embodiments where the processor 505 is embodied as an executor of instructions stored on a computer-readable storage medium, the instructions may specifically configure the processor 505 to perform the algorithms and operations described herein. In some example embodiments, the processor 505 may be a processor of a specific device (e.g., mobile communications device) configured for employing example embodiments by further configuration of the processor 505 via executed instructions for performing the algorithms, methods, and operations described herein.

The memory device 510 may be one or more tangible and/or non-transitory computer-readable storage media that may comprise volatile and/or non-volatile memory. In some example embodiments, the memory device 510 comprises Random Access Memory (RAM) including dynamic and/or static RAM, on-chip or off-chip cache memory, and/or the like. Further, memory device 510 may comprise non-volatile memory, which may be embedded and/or removable, and may comprise, for example, read-only memory, flash memory, magnetic storage devices (e.g., hard disks, floppy disk drives, magnetic tape, etc.) optical disc drives and/or media, non-volatile random access memory (NVRAM), various type of solid-state storage (e.g., flash memory), and/or the like. Memory device 510 may comprise a cache area for temporary storage of data. In this regard, some or all of memory device 510 may be comprised within the processor 505. In some example embodiments, the memory device 510 may be in communication with the processor 505 and/or other components via a shared bus. In some example embodiments, the memory device 510 may be configured to provide secure storage of data, such as, for example, the characteristics of the reference marks, in trusted modules of the memory device 510.

Further, the memory device 510 may be configured to store information, data, applications, computer-readable program code instructions and algorithms, and/or the like for enabling the processor 505 and the example apparatus 500 to carry out various functions in accordance with example embodiments described herein. For example, the memory device 510 may be configured to buffer input data for processing by the processor 505. Additionally, or alternatively, the memory device 510 may be configured to store instructions for execution by the processor 505.

The I/O interface 506 may be any device, circuitry, or means embodied in hardware or a combination of hardware and software that is configured to interface the processor 505 with other circuitry or devices, such as the user interface 525. In some example embodiments, the I/O interface may embody or be in communication with a bus that is shared by multiple components. In some example embodiments, the processor 505 may interface with the memory 510 via the I/O interface 506. The I/O interface 506 may be configured to convert signals and data into a form that may be interpreted by the processor 505. The I/O interface 506 may also perform buffering of inputs and outputs to support the operation of the processor 505. According to some example embodiments, the processor 505 and the I/O interface 506 may be combined onto a single chip or integrated circuit configured to perform, or cause the apparatus 500 to perform, various functionalities.

In some embodiments, the apparatus 500 or some of the components of apparatus 500 (e.g., the processor 505 and the memory device 510) may be embodied as a chip or chip set. In other words, the apparatus 500 may comprise one or more physical packages (e.g., chips) including materials, components and/or wires on a structural assembly (e.g., a baseboard). The structural assembly may provide physical strength, conservation of size, and/or limitation of electrical interaction for component circuitry comprised thereon. The apparatus 500 may therefore, in some cases, be configured to implement embodiments on a single chip or as a single "system on a chip," As such, in some cases, a chip or chipset may constitute means for performing the functionalities described herein and with respect to the processor 505.

The communication interface 515 may be any device or means (e.g., circuitry) embodied in hardware, a computer program product, or a combination of hardware and a computer program product that is configured to receive and/or transmit data from/to a network, including, but not limited to a smart space or similar RF memory tag environment and/or any other device or module in communication with the example apparatus 500. The communications interface may be configured to communicate information via any type of wired or wireless connection, and via any type of communications protocol, such as a communications protocol that supports cellular communications or near field communications. According to various example embodiments, the communication interface 515 may be configured to support the transmission and reception of communications in a variety of networks including, but not limited to Internet Protocol-based networks (e.g., the Internet), cellular networks, or the like. Further, the communications interface 515 may be configured to support device-to-device communications, such as in a mobile ad hoc network (MANET). Processor 505 may also be configured to facilitate communications via the communications interface 515 by, for example, controlling hardware comprised within the communications interface 515. In this regard, the communication interface 515 may comprise, for example, communications driver circuitry (e.g., circuitry that supports wired communications via, for example, fiber optic connections), one or more antennas, a transmitter, a receiver, a transceiver and/or supporting hardware, including, for example, a processor for enabling communications. Via the communication interface 515, the example apparatus 500 may communicate with various other network entities in a device-to-device fashion and/or via indirect communications via a base station, access point, server, gateway, router, or the like.

The access control manager 540 of example apparatus 500 may be any means or device embodied, partially or wholly, in hardware, a computer program product, or a combination of hardware and a computer program product, such as processor 505 implementing stored instructions to configure the example apparatus 500, memory device 510 storing executable program code instructions configured to carry out the functions described herein, or a hardware configured processor 505 that is configured to carry out the functions of the access control manager 540 as described herein. In some example embodiments, the access control manager 540 may be configured to implement the functionality described with respect to the engines and the ICs of FIG. 1. In an example embodiment, the processor 505 comprises, or controls, the user interface manager 540. The access control manager 540 may be, partially or wholly, embodied as processors similar to, but separate from processor 505. In this regard, the access control manager 540 may be in communication with the processor 505. In various example embodiments, the access control manager 540 may, partially or wholly, reside on differing apparatuses such that some or all of the functionality of the access control manager 540 may be performed by a first apparatus, and the remainder of the functionality of the access control manager 540 may be performed by one or more other apparatuses.

Further, the apparatus 500 and the processor 505 may be configured to perform various functionalities via access control manager 540. In this regard, the access control manager 540 may be configured to implement some or all of the operations and functionality described herein. For example, the access control manager 540 may be configured to implement the functionality described above with respect to FIGS. 1A through 4, and otherwise described above. Further, according to some example embodiments, the access control manager 540 may be configured to perform the operations described in FIG. 7 and described variations thereof. In this regard, referring to FIG. 7, the access control manager 540 may be configured to receive, at 700, a cryptographic keystream in association with a request from a first device for use of shared storage capacity of a second device (e.g., the apparatus 500) during a first write state for a memory segment. At 710, the access control manager 540 may be configured to cause the cryptographic keystream to be stored in the memory segment during a first write state for a memory segment, and, at 720, the access control manager 540 may be configured to transition from the first write state to a second write state for the memory segment. In some example embodiments, "transitioning" from a first state to a second state may, but need not require a direct transition from the first state to the second state. In other words, according to various example embodiments, rather than direct transitions, a transition from a first state to a second state may involve intermediate states between the first and second states. Further, the access control manager 540 may be configured to, at 730, receive data content during the second write state for the memory segment, and, at 740, transform the data content using the cryptographic keystream to form encrypted data content during the second write state for the memory segment. The a access control manager 540 may also be configured to cause, at 750, the encrypted data content to be stored in the memory segment during the second write state for the memory segment, and, at 760, transition from the second write state to a first read state for the memory segment. Finally, at 770, the access control manager 540 may be configured to cause the encrypted data content to be provided to one or more requesting devices during the first read state.

According to various example embodiments, the access control manager 540 may be additionally or alternative configured to determine that a reset event has occurred, and, in response to the reset event, revert the memory segment back the first write state. Additionally or alternatively, transforming the data content using the cryptographic keystream to form encrypted data content may comprise performing an exclusive-or operation on the data content using the keystream. According to some example embodiments, during the first write state, the access control manager 540 may be additionally or alternatively configured to cause authentication information to be stored in a memory segment configuration area of a memory device. According to some example embodiments, causing the authentication information to be stored permits subsequent path authentication in instances in which the data content has been transferred from another memory device within a shared storage capacity environment. Additionally or alternatively, in some example embodiments the access control manager 540 may be configured to receive the cryptographic keystream in a distributed shared storage environment. The access control manager 540 may, during a subscription read state, additionally or alternatively cause a subscription key to be utilized to access the encrypted data. Further, according to some example embodiments, the access control manager 540 may additionally or alternatively be configured to, during the second write state, determine a cyclic redundancy check (CRC) and cause the CRC to be stored with the encrypted data.

Referring now to FIG. 6, a more specific example apparatus in accordance with various embodiments of the present invention is provided. The example apparatus of FIG. 6 is a mobile terminal 10 configured to communicate within a wireless network, such as a cellular communications network, which may include an etag 32. The mobile terminal 10 may be configured to perform the functionality of the communications devices 102 and 14, the tag 106, and/or the apparatus 500 as described herein via the etag 32. The etag 32 may communicate with the processor 20 via an internal, wired communication channel or via RF communications with the antenna 12. More specifically, the mobile terminal 10 may be caused to perform the functionality described with respect to FIGS. 1A-4 and/or 7, via the processor 20. In this regard, according to some example embodiments, the processor 20 may be configured to perform the functionality described with respect to the access control manager 540. Processor 20 may be an integrated circuit or chip configured similar to the processor 505 together with, for example, the I/O interface 500. Further, volatile memory 40 and non-volatile memory 42 may be configured to support the operation of the processor 20 as computer readable storage media.

The mobile terminal 10 may also comprise an antenna 12, a transmitter 14, and a receiver 16, which may be comprised as parts of a communications interface of the mobile terminal 10. The speaker 24, the microphone 20, display 28 (which may be a touch screen display), and the keypad 30 may be comprised as parts of a user interface.

FIGS. 2A, 2B, 3B, 4 and 7 illustrate flowcharts or processes of example systems, methods, and/or computer program products according to example embodiments. It will be understood that each operation of the flowcharts, and/or combinations of operations in the flowcharts, can be implemented by various means. Means for implementing the operations of the flowcharts, combinations of the operations in the flowchart, or other functionality of example embodiments described herein may comprise hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions for performing the operations and functions of 2A, 2B, 3B, 4 and 7 and otherwise described herein may be stored on a memory device, such as memory device 510, volatile memory 40, or volatile memory 42, of an example apparatus, such as example apparatus 500 or mobile device 10, and executed by a processor, such as the processor 505 or processor 20. As will be appreciated, any such program code instructions may be loaded onto a computer or other programmable apparatus (e.g., processor 505, memory device 510, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be comprised within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
receiving, from a first device via a wireless link, a request for use of shared storage capacity of a second device, wherein the second device is separate from the first device, and wherein the second device comprises a radio frequency memory tag;
receiving, at the second device and during a first write state for a memory segment at the second device, a cryptographic keystream in association with the request;
storing, during the first write state, the cryptographic keystream in the memory segment;
transitioning from the first write state to a second write state for the memory segment;
receiving, at the second device and during the second write state, unencrypted data content;
transforming, at the second device and during the second write state, the unencrypted data content using the cryptographic keystream to form encrypted data content;
storing, during the second write state, the encrypted data content in the memory segment;
transitioning from the second write state to a first read state for the memory segment; and
providing, during the first read state, the encrypted data content to one or more requesting devices.

2. The method of claim 1 further comprising:
determining that a reset event has occurred; and
reverting, in response to the reset event, the memory segment back to the first write state.

3. The method of claim 1, wherein transforming the unencrypted data content using the cryptographic keystream to form encrypted data content comprises performing an exclusive-or operation on the unencrypted data content using the cryptographic keystream.

4. The method of claim 1, further comprising:
storing, during the first write state, authentication information in a memory segment configuration area of the second device.

5. The method of claim 4, wherein storing the authentication information permits subsequent path authentication in instances in which the data content has been transferred from another memory device within a shared storage capacity environment.

6. The method of claim 1, wherein the receiving the cryptographic keystream in association with the request from the first device comprises receiving the cryptographic keystream in a distributed, shared memory environment.

7. The method of claim 1 further comprising:
accessing, during a subscription read state, the encrypted data using a subscription key.

8. The method of claim 1 further comprising:
determining, during the second write state, a cyclic redundancy check; and
storing, during the second write state, the cyclic redundancy check with the encrypted data.

9. The method of claim 1, wherein the first device and the second device each comprise at least one processor circuitry and at least one memory circuitry.

10. The method of claim 1, wherein the radio frequency memory tag comprises memory including at least one memory segment, wherein the radio frequency memory tag further comprises a wireless interface enabling access to the memory by at least the first device.

11. The method of claim 10, wherein the wireless interface comprises a near field communications interface.

12. The method of claim 1, wherein the wireless link comprises at least one of a near field communications link or an ultrahigh frequency link.

13. An apparatus comprising:
at least one processor circuitry, and
at least one memory circuitry including computer program code, the at least one memory circuitry and the computer program code configured to, with the at least one processor circuitry, cause the apparatus to at least:
receive, from a first device via a wireless link, a request for use of shared storage capacity of the apparatus, wherein the apparatus is separate from the first device, and wherein the apparatus comprises a radio frequency memory tag;
receive, at the apparatus and during a first write state for a memory segment at the apparatus, a cryptographic keystream in association with the request;
store, during the first write state, the cryptographic keystream in the memory segment;
transition from the first write state to a second write state for the memory segment;
receive, at the apparatus and during the second write state, unencrypted data content;
transform, at the apparatus and during the second write state, the unencrypted data content using the cryptographic keystream to form encrypted data content;
store, during the second write state, the encrypted data content in the memory segment;
transition from the second write state to a first read state for the memory segment; and
provide, during the first read state, the encrypted data content to one or more requesting devices.

14. The apparatus of claim 13, wherein the apparatus is further configured to at least:
determine that a reset event has occurred; and
revert, in response to the reset event, the memory segment back to the first write state.

15. The apparatus of claim 13, wherein the apparatus is further configured to at least:
transform the unencrypted data content using the cryptographic keystream to form encrypted data content based on performing an exclusive-or operation on the unencrypted data content using the cryptographic keystream.

16. The apparatus of claim 13, wherein the apparatus is further configured to at least:
store, during the first write state, authentication information in a memory segment configuration area.

17. The apparatus of claim 16, wherein the storage of the authentication information permits subsequent path authentication in instances in which data content has been transferred from another memory device within a shared storage capacity environment.

18. The apparatus of claim 13, wherein the apparatus is further configured to at least receive the cryptographic keystream in association with the request from the first device via being directed to receive the cryptographic keystream in a distributed, shared memory environment.

19. The apparatus of claim 13, wherein the apparatus is further configured to at least:
access, during a subscription read state, the encrypted data using a subscription key.

20. The apparatus of claim 13, wherein the apparatus is further configured to at least:
determine, during the second write state, a cyclic redundancy check, and
store, during the second write state, the cyclic redundancy check with the encrypted data.

21. The apparatus of claim 13, wherein the apparatus comprises a mobile device.

22. The apparatus of claim 21, wherein the apparatus comprises a memory device that is configured such that storage capacity of the memory device is shared within a wireless network.

23. A non-transitory computer readable storage medium having program code, which when executed by at least one processor circuitry causes operations comprising:
receiving, from a first device via a wireless link, a request for use of shared storage capacity of a second device, wherein the second device is separate from the first device, and wherein the second device comprises a radio frequency memory tag;
receiving, at the second device and during a first write state for a memory segment at the second device, a cryptographic keystream in association with the request;
storing, during the first write state, the cryptographic keystream in the memory segment;
transitioning from the first write state to a second write state for the memory segment;
receiving, at the second device and during the second write state, unencrypted data content;
transforming, at the second device and during the second write state, the unencrypted data content using the cryptographic keystream to form encrypted data content;
storing, during the second write state, the encrypted data content in the memory segment;

transitioning from the second write state to a first read state for the memory segment; and providing, during the first read state, the encrypted data content to one or more requesting devices.

24. The non-transitory computer readable storage medium of claim 23, wherein the operations further comprise:

determining that a reset event has occurred;

reverting, in response to the reset event, the memory segment back to the first write state.

* * * * *